United States Patent
Lan et al.

(10) Patent No.: US 11,239,773 B2
(45) Date of Patent: Feb. 1, 2022

(54) METHOD FOR CONTROLLING START-UP PHASE OF PERMANENT MAGNET SYNCHRONOUS MOTOR

(71) Applicant: Zhongshan Broad-Ocean Motor Co., Ltd., Zhongshan (CN)

(72) Inventors: Jinghao Lan, Zhongshan (CN); Wenqing Bian, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 16/702,593

(22) Filed: Dec. 4, 2019

(65) Prior Publication Data

US 2020/0358382 A1 Nov. 12, 2020

(30) Foreign Application Priority Data

May 10, 2019 (CN) .......................... 201910389348.7

(51) Int. Cl.
*H02P 6/08* (2016.01)
*H02P 6/21* (2016.01)
*H02P 6/18* (2016.01)

(52) U.S. Cl.
CPC .................. *H02P 6/21* (2016.02); *H02P 6/08* (2013.01); *H02P 6/18* (2013.01)

(58) Field of Classification Search
CPC ...... H02P 6/21; H02P 6/08; H02P 6/18; H02P 21/24; H02P 21/34; H02P 21/18
See application file for complete search history.

(56) References Cited

U.S. PATENT DOCUMENTS

| 5,223,772 A * | 6/1993 | Carobolante | H03L 7/10 318/400.11 |
| 7,986,116 B2 * | 7/2011 | Imura | H02P 21/0003 318/400.15 |
| 8,698,433 B2 * | 4/2014 | Green | H02P 21/06 318/400.02 |
| 9,160,262 B2 * | 10/2015 | Bozic | H02P 21/18 |
| 9,369,073 B1 * | 6/2016 | Tian | H02P 6/21 |
| 2009/0153083 A1 * | 6/2009 | Rozman | H02P 23/14 318/400.06 |
| 2014/0042948 A1 * | 2/2014 | Green | H02P 27/04 318/503 |
| 2015/0288310 A1 * | 10/2015 | Pace | H02P 21/18 318/400.02 |
| 2015/0311845 A1 * | 10/2015 | Nagata | H02P 21/26 318/400.02 |

* cited by examiner

*Primary Examiner* — Rina I Duda
(74) *Attorney, Agent, or Firm* — Matthias Scholl P.C.; Matthias Scholl

(57) ABSTRACT

A method for controlling the start-up phase of a sensorless permanent magnet synchronous motor, the method including: 1) according to the formula $T=K\times Iq$ where T is a torque, K is a coefficient, and Iq is a current on a q-axis of a coordinate system of a motor mathematical model, based on a maximum output torque Tmax of a motor, calculating a maximum current Iq_max on the q-axis, setting the maximum current Iq_max as an upper limit of current on the q-axis, and controlling the motor to run in an open-loop control mode; and 2) when an actual running speed V of the motor reaches a first target speed V_ref1, reducing the maximum current Iq_max to a target current Iq0 on the q-axis corresponding to a target torque T0 set by users, and controlling the motor to run in a closed-loop control mode under the first target speed V_ref1.

15 Claims, 13 Drawing Sheets

METHOD FOR CONTROLLING START-UP PHASE OF PERMANENT MAGNET SYNCHRONOUS MOTOR

CROSS-REFERENCE TO RELATED APPLICATIONS

Pursuant to 35 U.S.C. § 119 and the Paris Convention Treaty, this application claims foreign priority to Chinese Patent Application No. 201910389348.7 filed May 10, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to a method for controlling the start-up phase of a permanent magnet synchronous motor.

Conventionally, the control method of a sensorless permanent magnet synchronous motor includes a constant torque control mode, a constant speed control mode and a constant air volume control mode.

FIG. 1 shows a block diagram of a conventional constant torque control mode. According to the formula $T=K \times Iq$ where K is a coefficient, with a given torque T, the input current Iq on the q-axis can be calculated. Thus, the constant torque control can be achieved through closed-loop control of the input current.

However, in the start-up phase of the motor, the closed-loop control of the input current is not yet formed. To start the motor, an initial rotation speed is input. When the input value of the rotation speed is bigger than needed, this leads to the motor vibration and noise. When the input value of the rotation speed is smaller than needed, this leads to the start failure.

SUMMARY

Provided is a method for controlling the start-up phase of a sensorless permanent magnet synchronous motor, the method comprising an open-loop control and a constant speed closed-loop control.

The disclosure provides a method for controlling the start-up phase of a sensorless permanent magnet synchronous motor, the method comprising:

1) according to the formula $T=K \times Iq$ where T is a torque, K is a coefficient, and Iq is a current on a q-axis of a coordinate system of a motor mathematical model, based on a maximum output torque Tmax of a motor, calculating a maximum current Iq_max on the q-axis, setting the maximum current Iq_max as an upper limit of current on the q-axis, and controlling the motor to run in an open-loop control mode; and
2) when an actual running speed V of the motor reaches a first target speed V_ref1, reducing the maximum current Iq_max to a target current Iq0 on the q-axis corresponding to a target torque T0 set by users, and controlling the motor to run in a closed-loop control mode under the first target speed V_ref1.

The method further comprises: in the closed-loop control mode under the first target speed V_ref1, increasing the first target speed V_ref1 to a maximum target speed V_max, when the actual running speed V of the motor reaches the maximum target speed V_max, controlling the motor to run in a closed-loop control mode under the maximum target speed V_max; and when the actual running speed V of the motor is less than the maximum target speed V_max, controlling the motor to run in a constant torque closed-loop control mode.

In the constant torque closed-loop control mode, the motor runs under the target torque T0; the target torque T0 is output by controlling the target current Iq0 on the q-axis by a proportional integral (PI) controller.

In the constant torque closed-loop control mode, when a command torque is smaller than expected or a load is increased, the actual running speed V is smaller than a preset minimum target speed V_min, and the motor exits the constant torque closed-loop control mode and enters a constant speed control mode; increasing the target torque T0 by an extra current delta_Iq0, so that the motor runs in the constant speed closed-loop control mode under the minimum target speed V_min.

When the motor runs in the constant speed closed-loop control mode under the minimum target speed V_min, and a speed difference Err between the actual running speed V and the minimum target speed V_min is greater than a preset value E0, the motor exits the constant speed control mode and enters a constant torque closed-loop control mode under the target torque T0.

The actual running speed V refers to a real-time detected speed Vt obtained after the motor runs for a time 72 under the first target speed V_ref1, and the real-time detected speed Vt is equivalent to the first target speed V_ref1.

The time T2 ranges from 2-4 seconds, and a difference between the real-time detected speed Vt and the first target speed V_ref1 is within 10 rpm.

Advantages of the method for controlling the start-up phase of a sensorless permanent magnet synchronous motor according to embodiments of the disclosure are summarized as follows:

A. The starting process is smooth, eliminating the problems of motor vibration and noise cause by the conventional control strategy during startup;

B. The starting process is stable, improving the startup reliability;

C. The motor can be started under the minimum torque command, and the switching process of the control mode is smooth.

DETAILED DESCRIPTIONS

Figure 3:
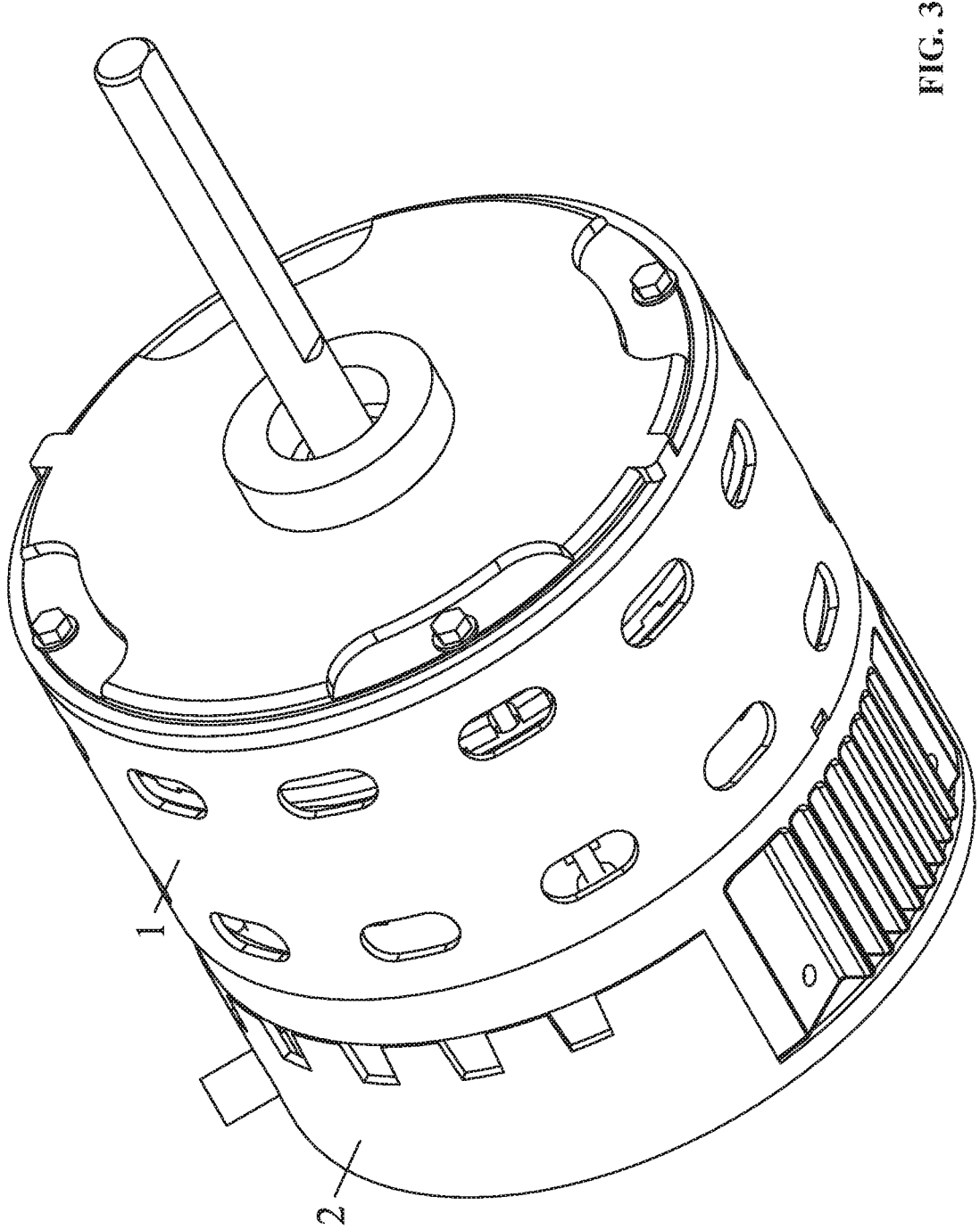
FIG. 3 is a perspective view of a permanent magnet synchronous motor according to one embodiment of the disclosure.
Figure 4:
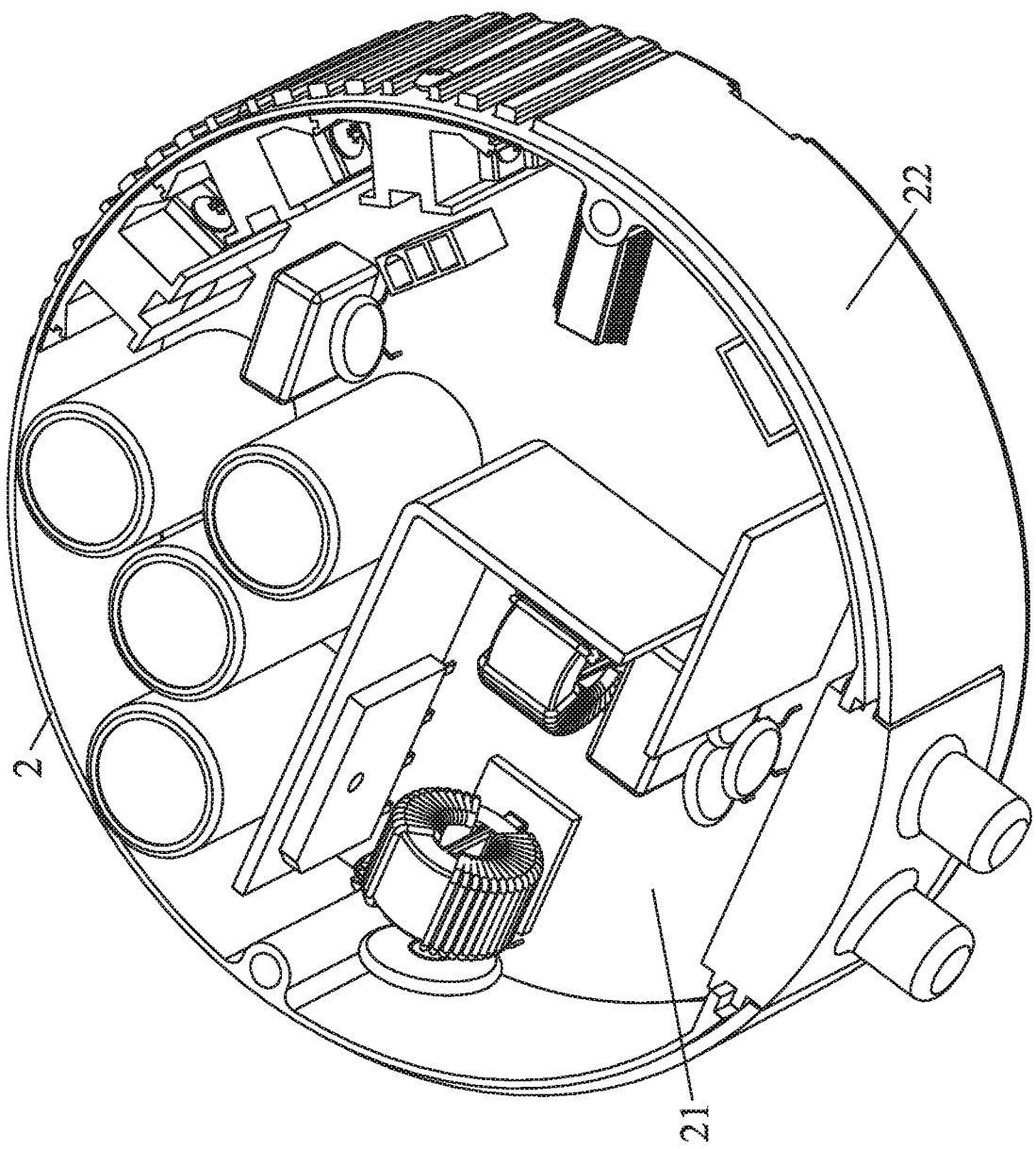
FIG. 4 is a perspective view of a motor controller of a permanent magnet synchronous motor according to one embodiment of the disclosure.
Figure 5:
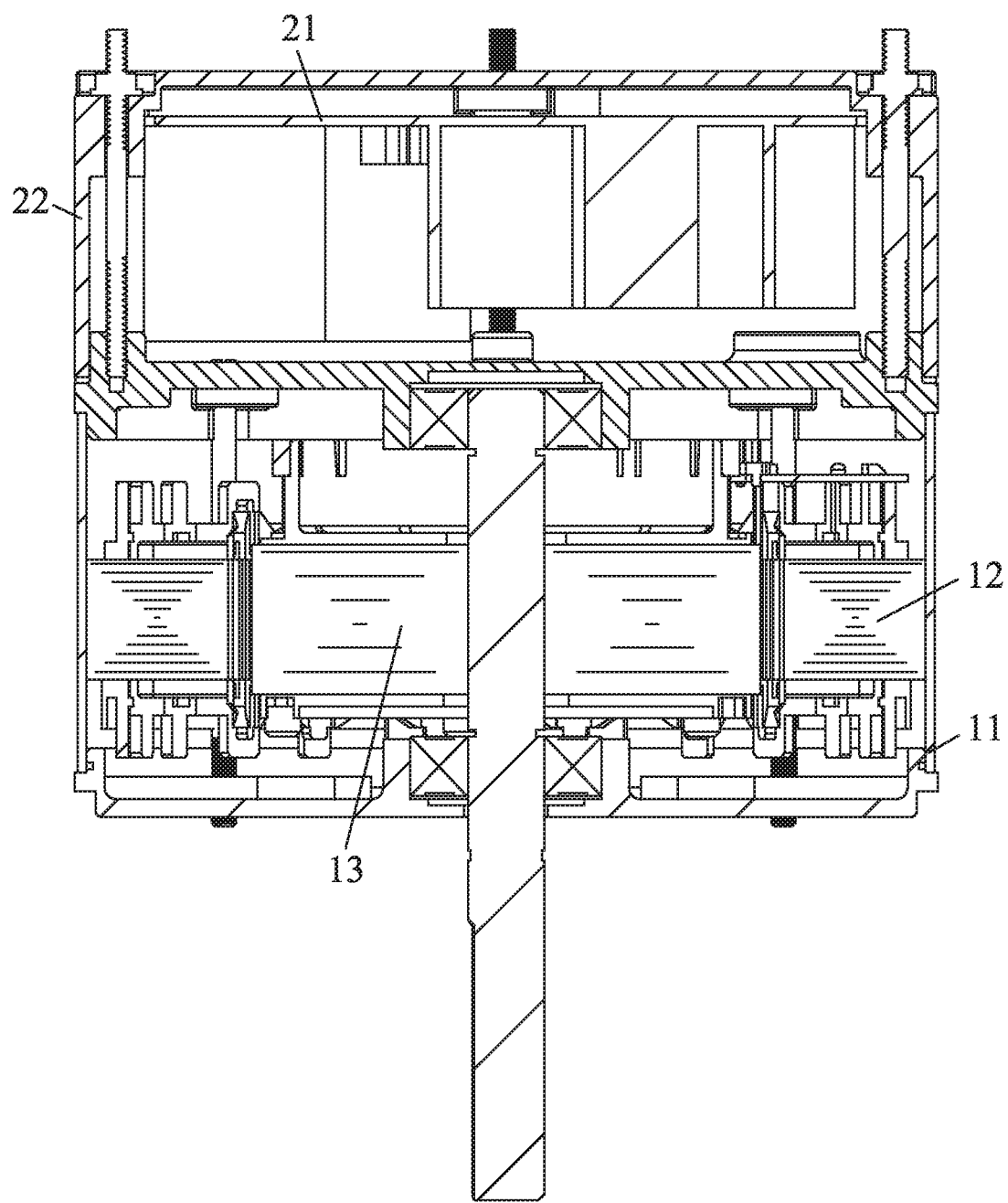
FIG. 5 is a sectional view of a permanent magnet synchronous motor according to one embodiment of the disclosure.

As shown in FIG. 3, FIG. 4 and FIG. 5, there provided is a three-phase permanent magnet synchronous motor comprising a motor unit 1 and a motor controller 2. The motor unit 1 comprises a stator assembly 12, a rotor assembly 13 and a housing assembly 11; the stator assembly 12 is mounted on the housing assembly 11; the rotor assembly 13 is nested in or outside the stator assembly 12; the motor controller 2 comprises a control box 22 and a control circuit board 21 mounted therein; the control circuit board 21 comprises a power circuit, a microprocessor, a bus voltage sensing circuit, and an inverter; the power supply circuit supplied power to each part of the circuit. The DC bus voltage Uabc is input to the microprocessor by the bus voltage detection circuit; the microprocessor controlled the inverter which controls the on and off of the coil windings in each phase of the stator assembly 12.

Figure 6:
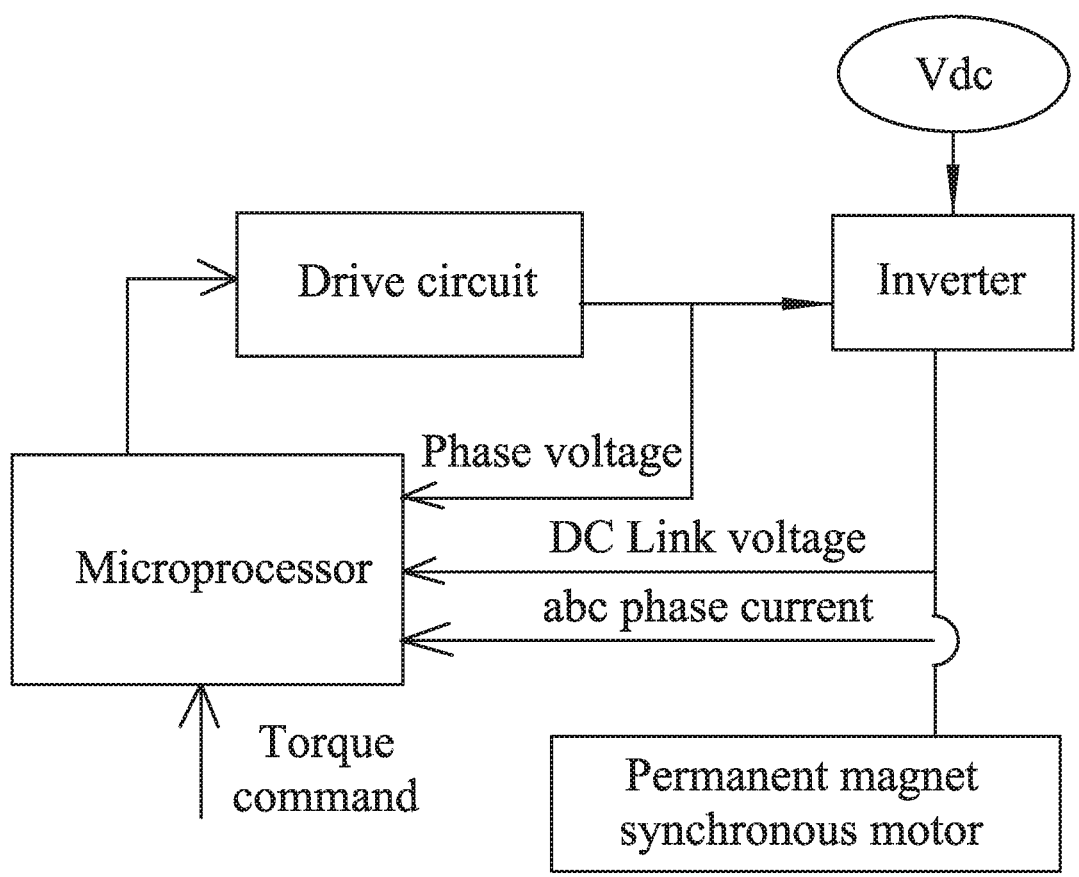
FIG. 6 is a principle block diagram of a motor controller of a permanent magnet synchronous motor according to one embodiment of the disclosure.
Figure 7:
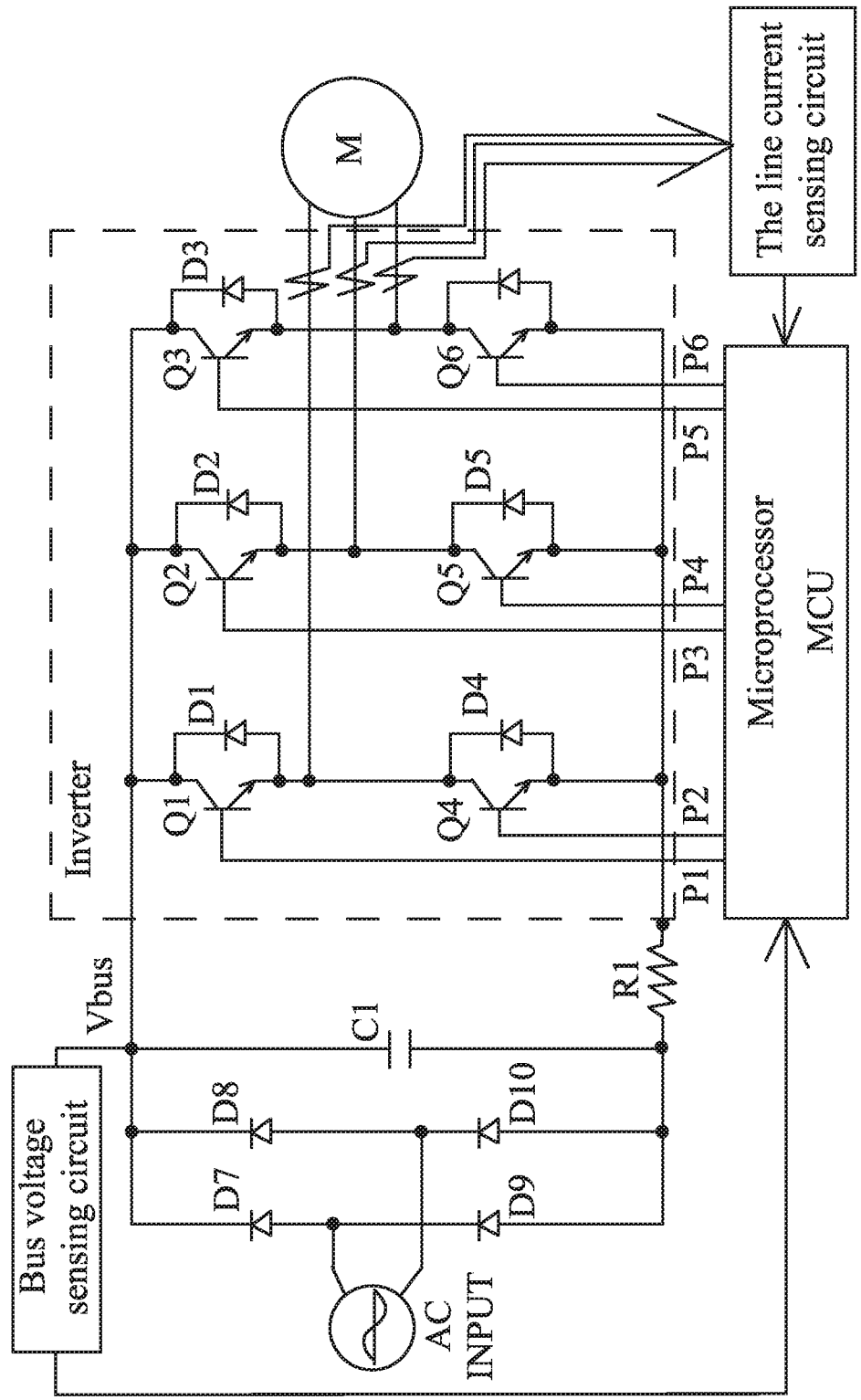
FIG. 7 is a circuit diagram of the motor controller in FIG. 6.

As shown in FIG. 6 and FIG. 7, suppose that the line current sensing circuit of the three-phase permanent magnet brushless DC motor input the phase currents ia, ib, and ic to the microprocessor. Then the DC bus voltage Vbus is output from one end of the capacitor C1 after the AC INPUT passed through the full-wave rectification circuit consisting of diodes D7, D8, D9, and D10, wherein the DC bus voltage Vbus is related to the input AC voltage. Six PWM signals (P1, P2, P3, P4, P5, P6) are calculated by a microprocessor and then input into an inverter through six electronic switch tubes (Q1, Q2, Q3, Q4, Q5, Q6) on the inverter, respectively.

Figure 1:
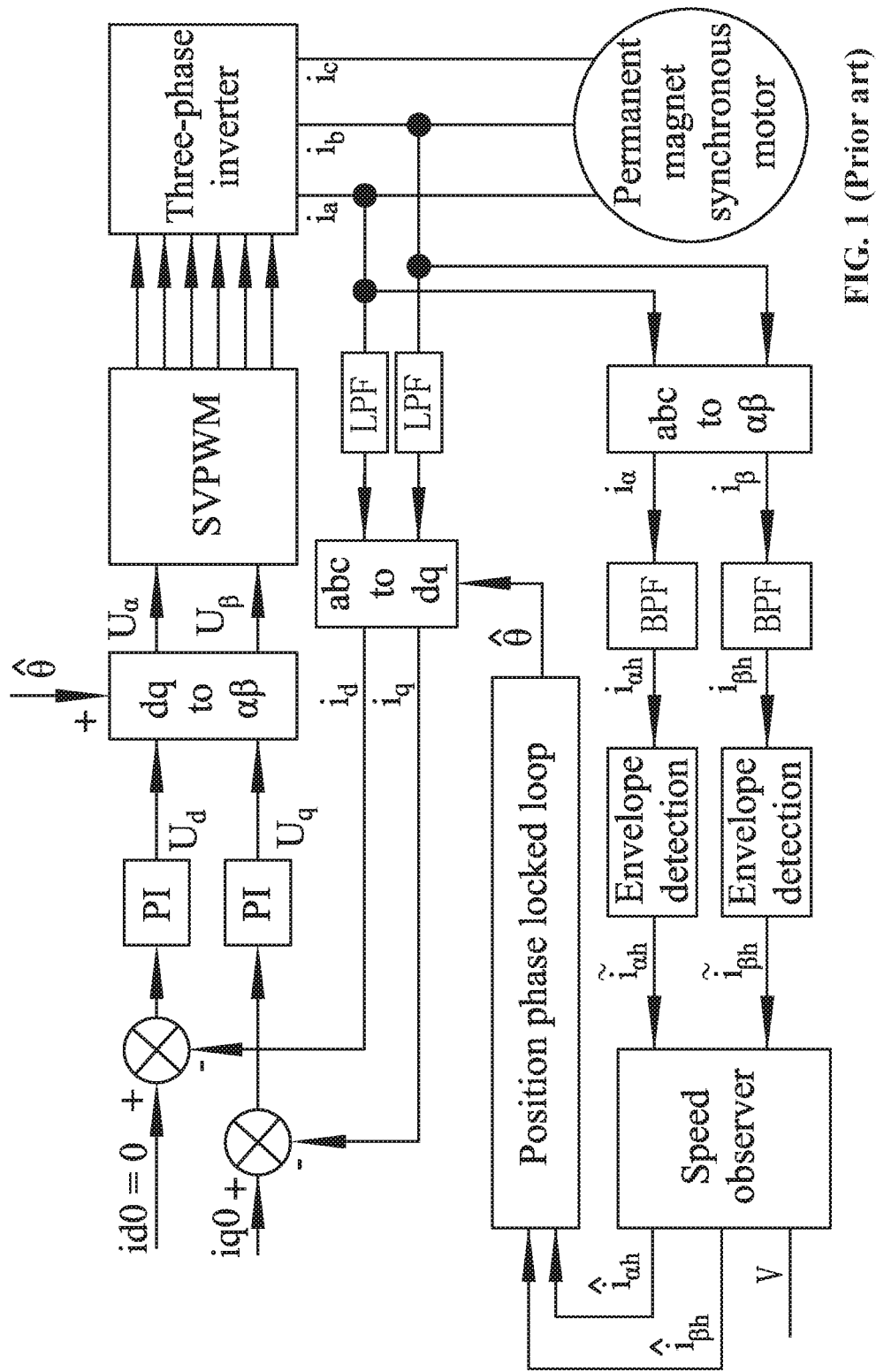
FIG. 1 is a block diagram of a constant torque control of a sensorless permanent magnet synchronous motor in the prior art.
Figure 2:
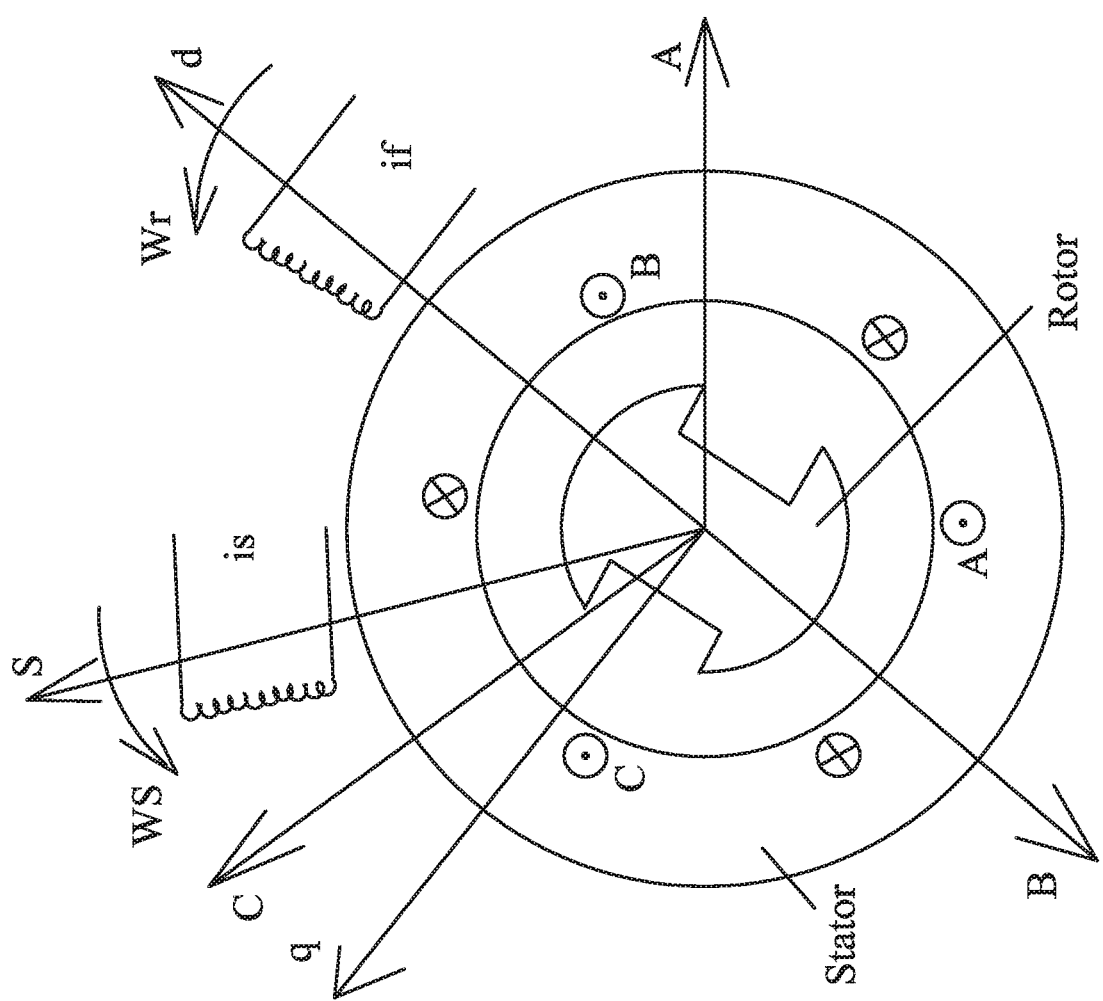
FIG. 2 is a principle diagram of the vector control of a sensorless permanent magnet synchronous motor.

As shown in FIG. 2, the basic working principle of a permanent magnet synchronous motor based on sensorless vector control is briefly described as follows: the permanent magnet synchronous motor is regarded as the interaction effects of rotating magnetic field between a stator and a rotor. There are two coordinate systems in the figure, one is a rotating coordinate system—DQ coordinate system, the other is a stationary coordinate system—ABC coordinate system (which can be converted into a coordinate system where α and β are perpendicular to each other). The rotor rotated at a rotational speed wr under the action of the excitation current if, and the stator rotated at a rotational speed ws under the action of the excitation current is, the resultant vector of the stator in the figure is S; according to the formula of electromagnetic torque:

$$T_e = P_0 \cdot \psi_f \times i_q \quad (1)$$

where $P_0$ is a pole pair (constant) of the motor, $\psi_f$ is a flux linkage generated under the action of the field current if.

Based on the rotor is a permanent magnet rotor, when if=0 and $\psi_f$ is a constant, the formula of electromagnetic torque became:

$$T_e = K \times i_q \quad (2)$$

where K is a constant, and the electromagnetic torque Te of the permanent magnet synchronous motor is only determined by the q-axis current.

Figure 8:
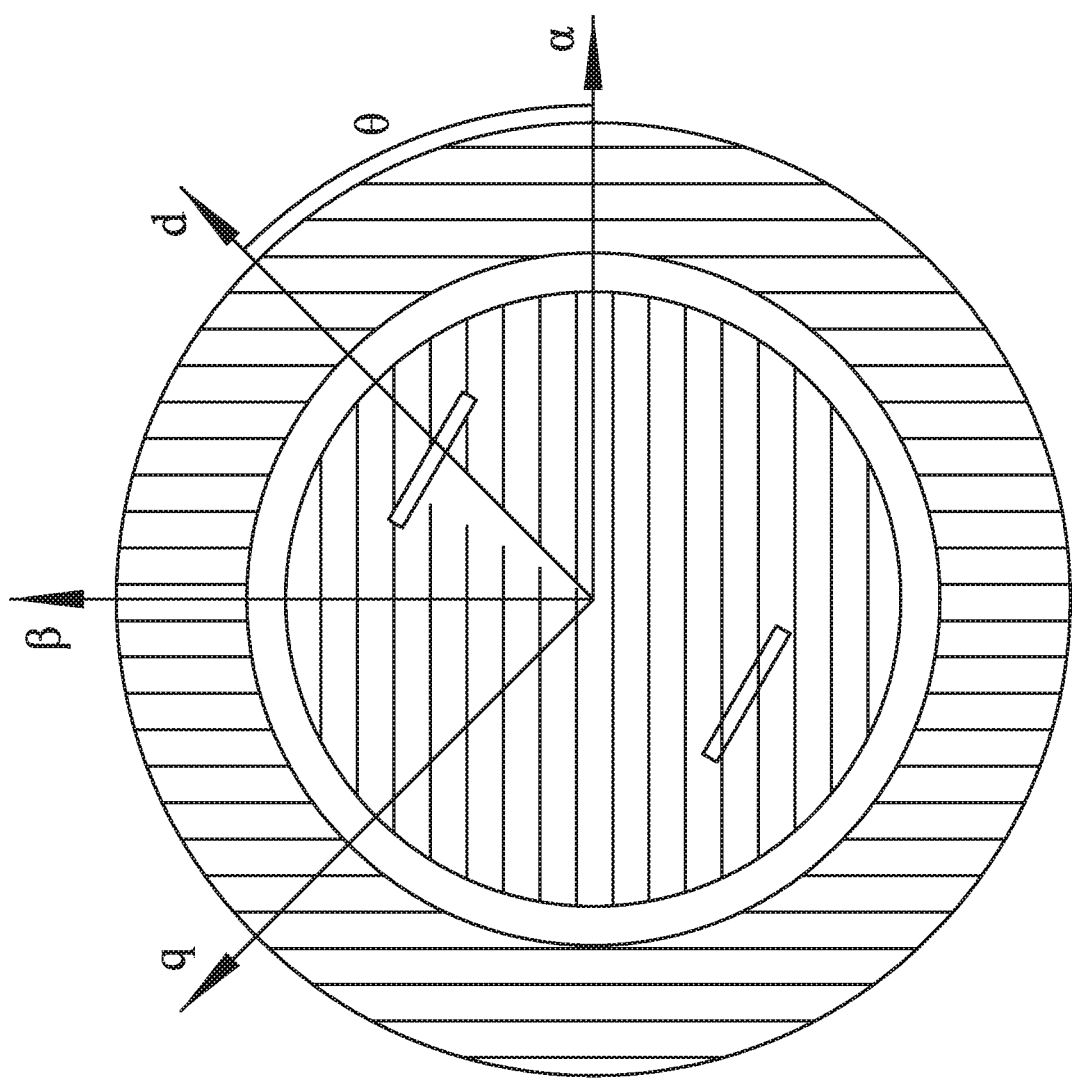
FIG. 8 is a coordinate system of a permanent magnet synchronous motor under vector control.

As shown in FIG. 8, the stationary coordinate system of the stator—ABC coordinate system is replaced by an αβ coordinate system in which α and β are perpendicular to each other, and the rotation coordinate system of the rotor is a dq coordinate system, in which θ is the angle between αβ coordinate system and dq coordinate system.

Figure 9:
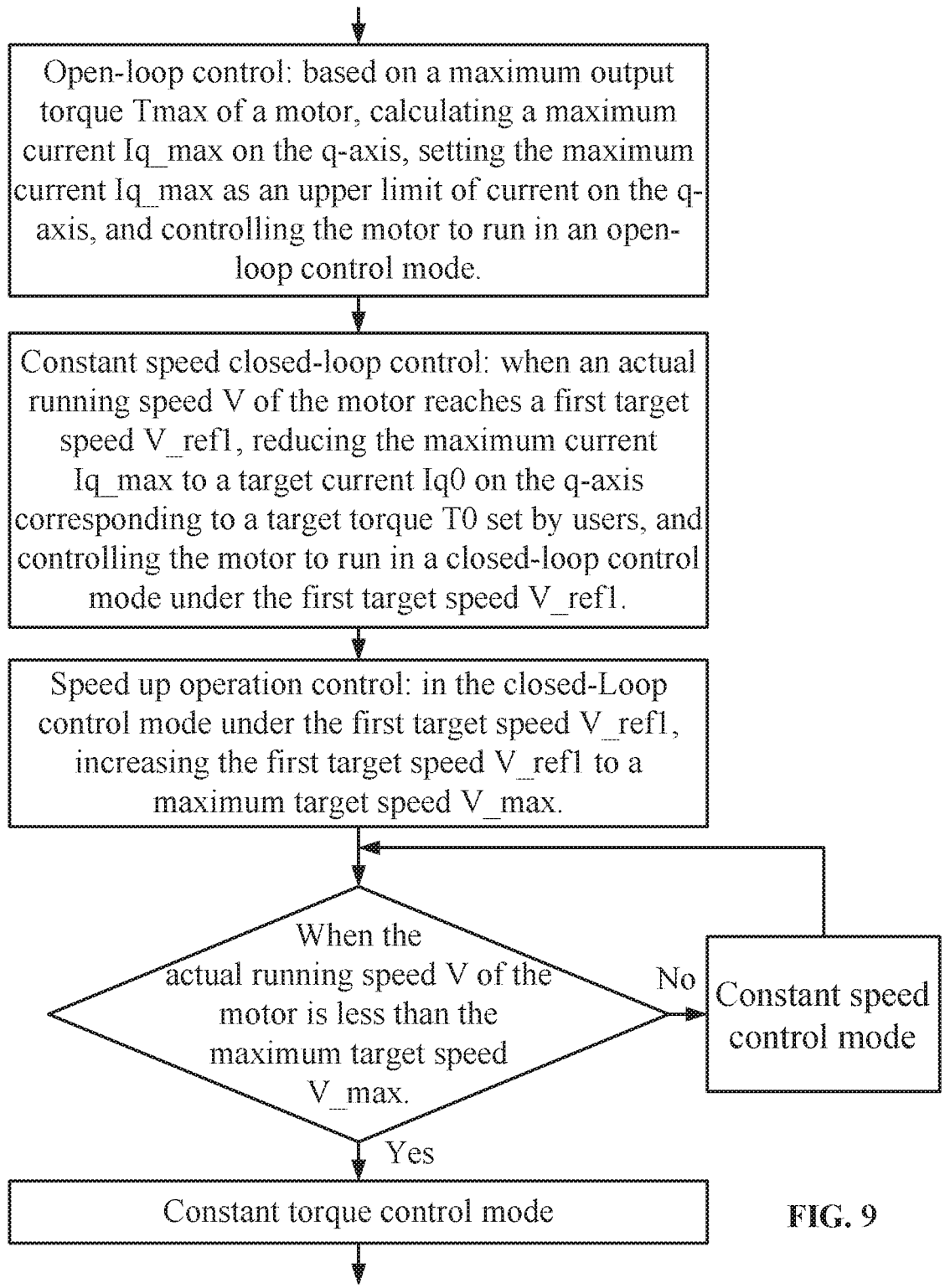
FIG. 9 is a flowchart illustrating the starting control of a permanent magnet synchronous motor according to one embodiment of the disclosure.

As shown in FIG. 9, the starting control method for a sensorless permanent magnet synchronous motor comprises an open-loop control and a constant speed closed-loop control. The sensorless permanent magnet synchronous motor is started and runs in a constant torque control mode or a constant speed control mode, and the control method comprises:

open-loop control: according to the formula T=K×Iq where T is a torque, K is a coefficient, and Iq is a current on a q-axis of a coordinate system of a motor mathematical model, based on a maximum output torque Tmax of a motor, calculating a maximum current Iq_max on the q-axis, setting the maximum current Iq_max as an upper limit of current on the q-axis, and controlling the motor to run in an open-loop control mode;

constant speed closed-loop control: when the actual running speed V of the motor reaches a first target speed V_ref1, reducing the maximum current Iq_max to a target current Iq0 on the q-axis corresponding to a target torque T0 set by users, and controlling the motor to run in a closed-loop control mode under the first target speed V_ref1;

speed up operation control: in the closed-loop control mode under the first target speed V_ref1, increasing the first target speed V_ref1 to a maximum target speed V_max, when the actual running speed V of the motor reaches the maximum target speed V_max, controlling the motor to run in a closed-loop control mode under the maximum target speed V_max; and when the actual running speed V of the motor is less than the maximum target speed V_max, controlling the motor to run in a constant torque closed-loop control mode.

Figure 10:
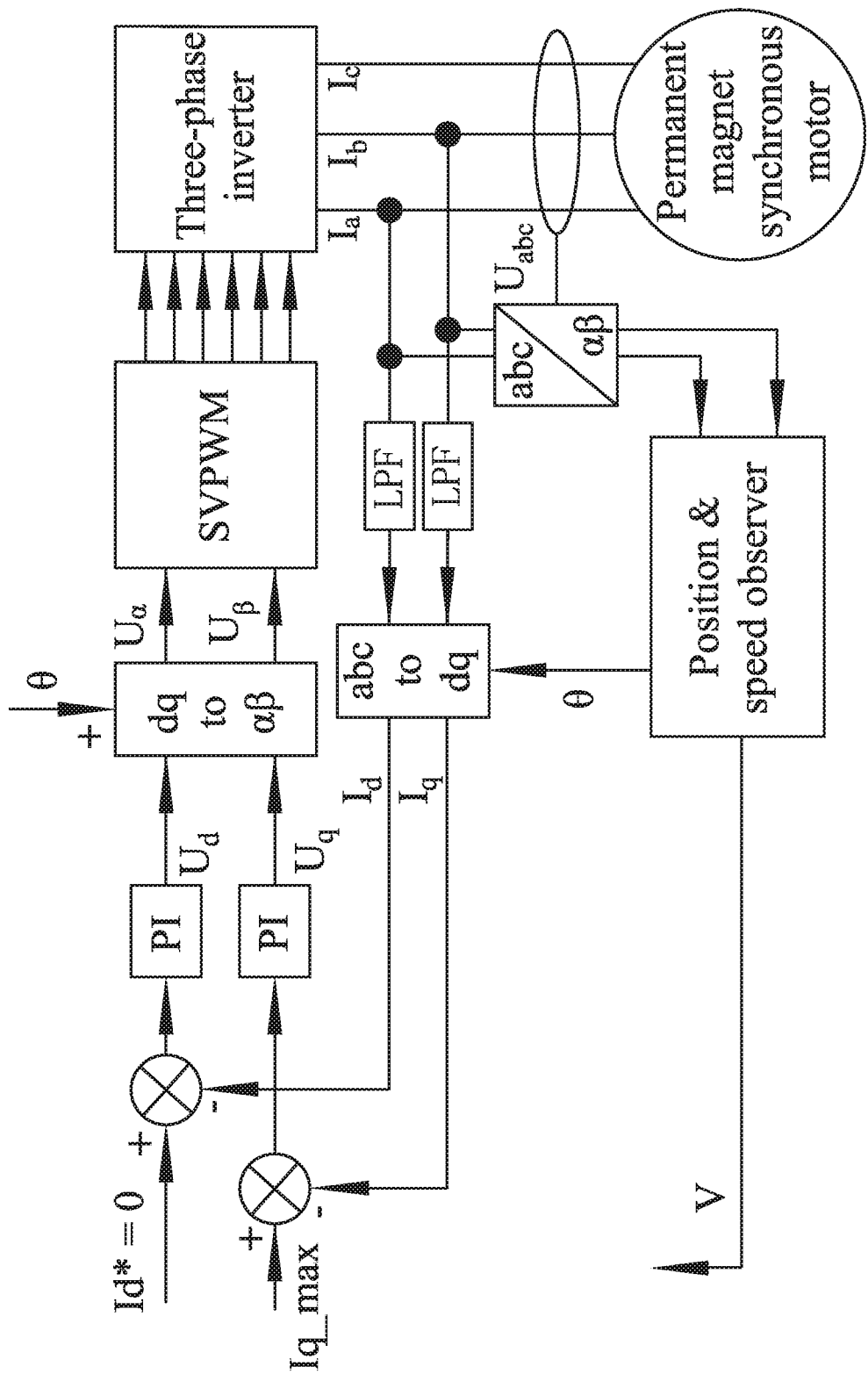
FIG. 10 is a block diagram of an open loop control of a permanent magnet synchronous motor according to one embodiment of the disclosure.

Open-loop control: according to the formula T=K×Iq where T is a torque, K is a coefficient, and Iq is a current on a q-axis of a coordinate system of a motor mathematical model, based on a maximum output torque Tmax of a motor, calculating a maximum current Iq_max on the q-axis, setting the maximum current Iq_max as an upper limit of current on the q-axis, and controlling the motor to run in an open-loop control mode, as shown in FIG. 10.

Figure 11:
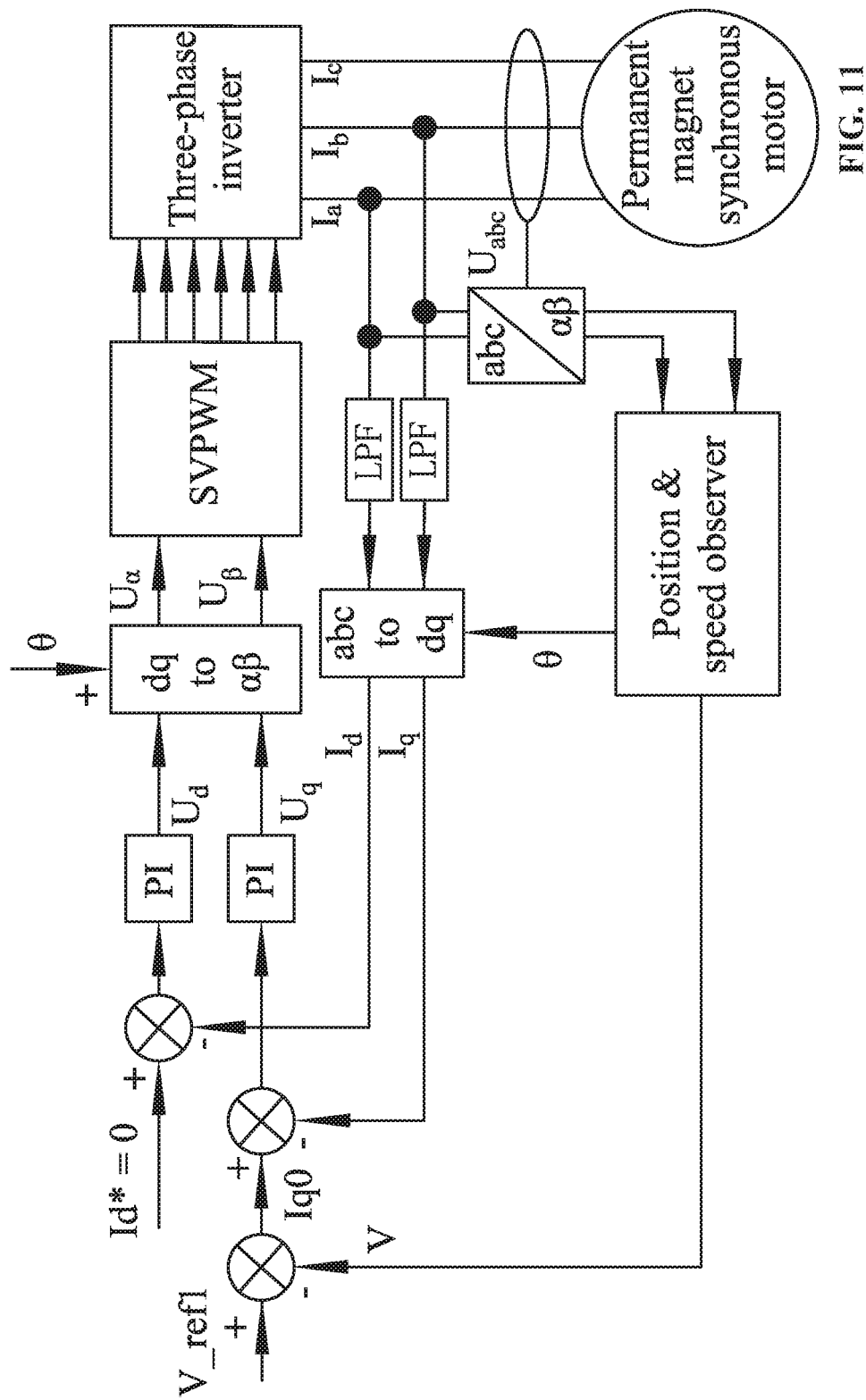
FIG. 11 is a block diagram of a constant speed closed-loop control of a permanent magnet synchronous motor according to one embodiment of the disclosure.
Figure 12:
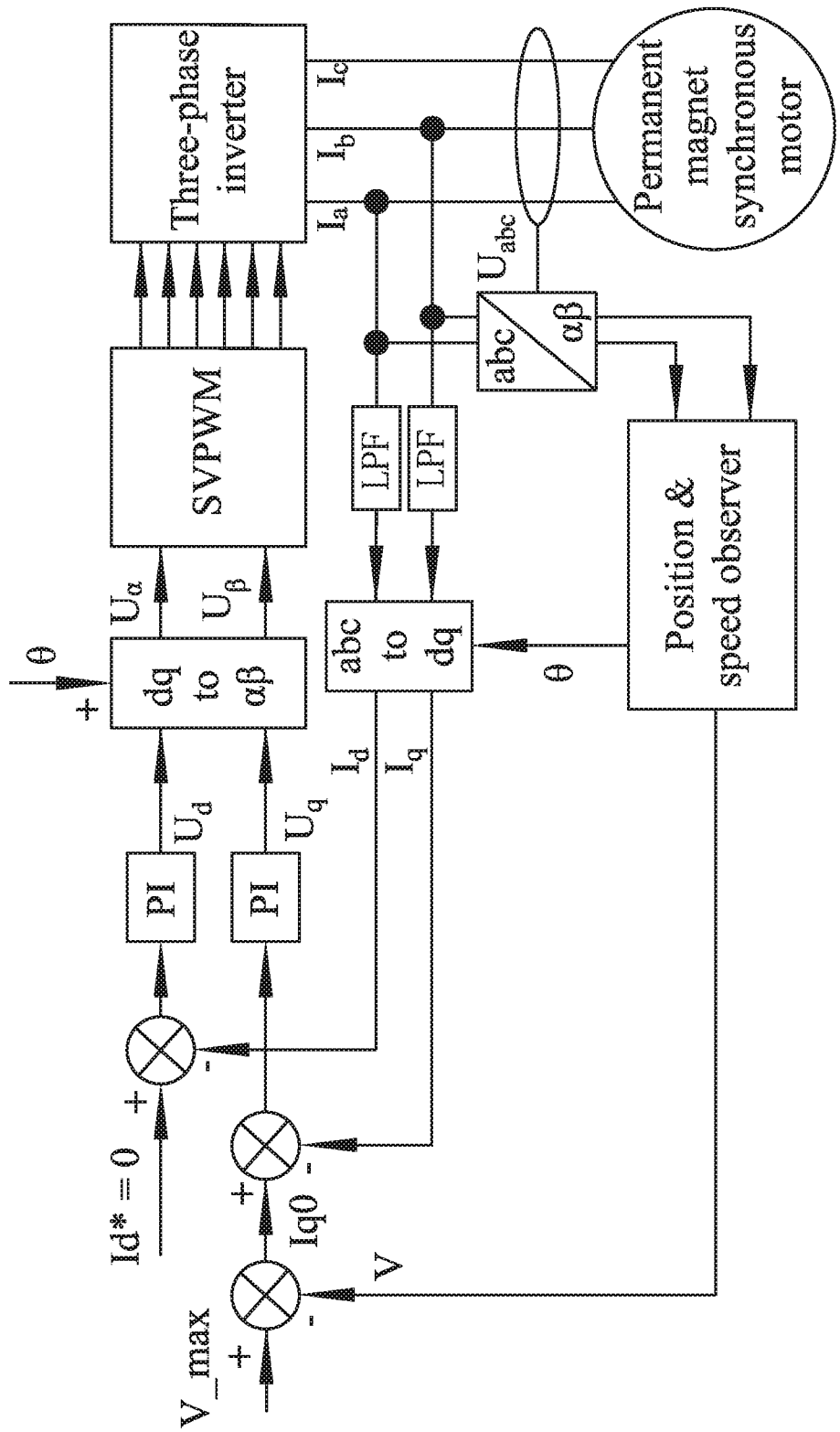
FIG. 12 is a block diagram of a speed up operation control of a permanent magnet synchronous motor according to one embodiment of the disclosure.

Constant speed closed-loop control: when an actual running speed V of the motor reaches a first target speed V_ref1, reducing the maximum current Iq_max to a target current Iq0 on the q-axis corresponding to a target torque T0 set by users, and controlling the motor to run in a closed-loop control mode under the first target speed V_ref1, as shown in FIG. 11;

speed up operation control: in the closed-loop control mode under the first target speed V_ref1, increasing the first target speed V_ref1 to a maximum target speed V_max, when the actual running speed V of the motor reaches the maximum target speed V_max, controlling the motor to run in a closed-loop control mode under the maximum target speed V_max; and when the actual running speed V of the motor is less than the maximum target speed V_max, controlling the motor to run in a constant torque closed-loop control mode, see FIG. 12, V_max>V_ref1.

Figure 13:
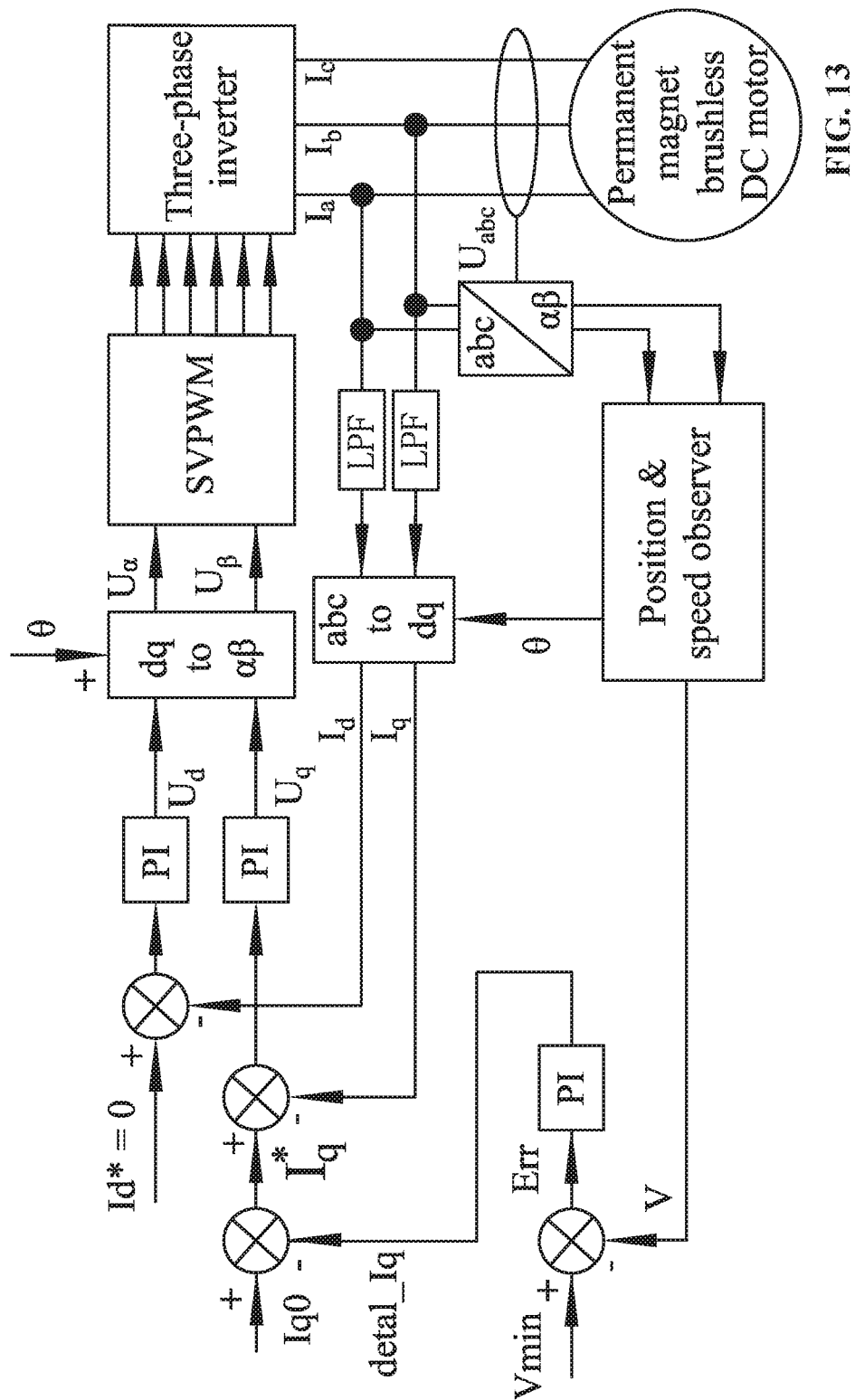
FIG. 13 is a block diagram of a constant torque closed-loop control of a permanent magnet synchronous motor according to one embodiment of the disclosure.

The constant torque closed-loop control: running the motor in the constant torque closed-loop control under the target torque T0, that is, the target current Iq0 on the q-axis is calculated based on the target torque T0 set by users, and the target torque T0 is output by controlling the target current Iq0 on the q-axis by a proportional integral (PI) controller, see FIG. 13. In the constant torque closed-loop control, when the command value of the torque is smaller than expected or the load is increased, and the actual steady-state running speed V is smaller than the preset minimum target speed V_min, the motor exits the constant torque closed-loop control mode and enters the constant speed control mode; further, increasing the target torque T0 by an extra current delta_Iq0 so that the motor runs in the constant speed closed-loop control mode under the minimum target speed V_min, wherein V_max>V_min≥V_ref1. When the motor runs in the constant speed control with the preset minimum speed V_min, the motor will exit the constant speed control mode and enter the constant torque control mode again as the speed difference Err between the actual steady-state running speed V and the minimum target speed V_min is larger than the preset value E0, that is, running in the constant torque closed-loop control mode by setting the target torque T0 as a target. That is, the target current Iq0 on the q-axis is calculated based on the target torque T0 set by users, and then the proportional integral (PI) controller operates the closed-loop control by setting the target current Iq0 on the q-axis as a target.

The actual steady-state running speed V mentioned in the above control method, refers to a real-time detected speed Vt obtained after the motor runs for a time T2 under the first target speed V_ref1, and the real-time detected speed Vt is equivalent to the first target speed V_ref11.

The time T2 ranges from 2-4 seconds, and a difference between the real-time detected speed Vt and the first target speed V_ref1 is within 10 rpm.

After a large number of experiments and analysis, the control strategy provided by the disclosure can realize the following effects: the starting process of the motor is smooth and reliable, and the resulting noise and the vibration can be ignored, thus satisfying user requirement and experience. In addition, the starting process is stable and smooth as above effect although the motor is started by using the default minimum torque value, which satisfies the adjustment range of the torque for users.

The specific experimental process is as follows:

Selecting a motor for the experiment, and setting the V_ref1=300 rpm, V_ref2=600 rpm, V_min=580 rpm. The sensorless permanent magnet synchronous motor runs in a constant torque control mode, that is, the target current Iq0=1.5 A is calculated according to the target torque T0=79 N·m set by users, and the constant torque control keeps working by setting the target torque T0 as a target.

Step 1): open-loop control stage: calculating the maximum current Iq_max on the q-axis based on the maximum output torque Tmax of the motor, setting the maximum current Iq_max obtained as the upper limit of current to the current on the q-axis. The first target speed V_ref1 is defined as the speed switching to the closed-loop, wherein the first target speed V_ref1=300 rpm. The time for the open loop control stage is t1, which is set to be longer, thus avoiding vibration and noise due to the larger current increment on the q-axis.

Step 2): constant speed closed-loop control stage: the constant speed control runs at a first target speed V_ref1=300 rpm as a target. After the motor constantly and stably runs at the first target speed V_ref1, the upper limit of current to the given current on the q-axis is slowly reduces from Iq_max to the current Iq0 corresponding to the target torque T0 set by users. At this time, the motor still constantly runs at the first target speed V_ref1, and then steps into the speed up operation stage; that is, by reducing the real-time measured current Iq1, the real-time measured current Iq1 on the q-axis is compared with the given value Iq0 on the q-axis corresponding to the target torque T0. The real-time measured current Iq1 on the q-axis is slowly converged to Iq0 by using the current PI controller.

Step 3): speed up operation stage: the first target speed is increased from V_ref1=300 rpm/m to V_ref2=600 rpm. That is, in the speed closed control mode, the first target speed V_ref1 is increased to the maximum target speed V_max to control the motor, wherein V_max refers to the maximum speed. When the actual steady-state running speed V of the motor reaches the maximum target speed V_max, the motor keeps running in the constant speed closed-loop control mode with the maximum target speed V_max. When the actual table operating speed V of the motor cannot reach the maximum target speed V_max, the motor runs the constant torque closed-loop control mode.

Step 4): constant torque closed-loop control stage: the target torque T0 is set for running the constant torque control, that is, the current PI controller on the q-axis realize the closed-loop control by setting target current Iq0 on the q-axis as a target, see FIG. 13.

In the constant torque control stage, when the command value of the torque is smaller than expected or the load is increased, the actual steady-state running speed V is smaller than the preset minimum target speed V_min, thus exiting the constant torque closed-loop control mode and entering the constant speed control mode; further, adding the target current Iq0 on the q-axis to the extra current delta_Iq0 to intervene the speed, so that the motor runs in the constant speed closed-loop control mode at the minimum target speed V_min; when the motor runs in the constant speed control at a preset minimum target speed V_min, the motor exits the constant speed control and enters the constant torque control again. However, the motor will quit the constant torque control mode and then enters the constant torque closed-loop control again, as the speed difference Err between the actual steady-state running speed V and the minimum target speed V_min is larger than the preset value E0. That is, the target torque T0 is set for running the constant torque control, and the current PI controller on the q-axis runs the closed-loop control by setting the target current Iq0 as s target.

Whether or not the speed-based PI controller exits a working mode is determined by the speed difference Err; when the speed difference Err is larger than a preset value $E_0$, the speed-based PI controller exits the working mode. Delta_iq is obtained by integrating the speed difference Err.

Whether or not the speed-based PI controller exits a working mode is determined by the speed difference Err (Err=V1−V); when the speed difference Err is greater than or equal to zero, the speed-based PI controller accesses the working mode and the current increment delta_iq on the q-axis is not zero; when speed difference ERR is less than or equal to zero, the speed-based PI controller exits the working mode and the current increment delta_iq on the q-axis is zero, which is equivalent to entering the mode of constant torque control.

For example, conventionally, a fan is driven by a motor which is set in a constant torque control mode. The torque T set by users is converted to a given current iq_limit of the q-axis, wherein the given current iq_limit is equivalent to the target current iq_A, which accesses the constant torque control mode by using the speed-based PI controller on the q-axis; the speed decreases when the external static pressure suddenly increases dramatically (equal to the load increment). When the real-time measured speed V is less than the preset reference speed V_ref1 (e.g. 600 rpm), the device exits the constant torque control mode and enter the constant speed control mode;

The real-time measured speed V is estimated by a speed observer, and a signal corresponding to the real-time measured speed V is processed by average filtering and recursive filtering, which inhibits a speed fluctuation in a small range without affecting the response speed.

Using the speed-based PI controller, rapidly adjusting the extra current delta_iq to ensure that the speed difference Err tends to be zero and the speed fluctuation is slight. This method is capable of adjusting rapidly the speed to a steady state during the load (speed V) fluctuations and maintaining a peaceful transition between the input and output of extra current, which basically solves all the shortcomings of the conventional control strategy.

The control strategy has the following critical points:

1. Processing of a Speed Feedback Signal:

Speed is a very important electrical parameter for a vector control without position sensor. In the constant torque mode, an unstable speed will cause the instability of torque. Thus, a speed feedback signal must be processed to ensure that the speed feedback signal is stable without affecting the response speed. At present, the speed signal is processed by average filtering and recursive filtering to inhibit a speed fluctuation in a small range without affecting the response speed, which basically meets the control requirements.

2. Selection of Control Speed and Control Parameters for the Speed-Based PI Controller:

The extra current delta_iq output by the speed-based PI controller is required to real-time response to the current-based PI controller of inner loop, but it is necessary to reconcile the demand of response speed and inner loop (current-based PI controller) speed, and the speed-based PI controller cannot run too fast. However, oscillation of the device will take place because the speed-based PI controller run too slowly or technicians ignored the timely adjustment on this problem. In addition, different load characteristics have different execution speeds.

The analysis assumes that the greater the moment of inertia of the load, the slower the response speed of the speed-based PI controller; the smaller the moment of inertia, the faster the response speed of the speed-based PI controller.

The real-time measured speed V is measured by a speed estimating module, the signal of real-time measured speed V is processed by average filtering and recursive filtering to inhibit the speed fluctuation in a small range without affecting the response speed.

It will be obvious to those skilled in the art that changes and modifications may be made, and therefore, the aim in the appended claims is to cover all such changes and modifications.

What is claimed is:

1. A method for controlling a start-up phase of a sensorless permanent magnet synchronous motor, comprising:
    1) according to the formula T=K×Iq where T is a torque, K is a coefficient, and Iq is a current on a q-axis of a coordinate system of the sensorless permanent magnet synchronous motor, based on a maximum output torque Tmax of the sensorless permanent magnet synchronous motor, calculating a maximum current Iq_max on the q-axis, setting the maximum current Iq_max as an upper limit of a current on the q-axis, and controlling the sensorless permanent magnet synchronous motor to run in an open-loop control mode; and
    2) when an actual running speed V of the sensorless permanent magnet synchronous motor reaches a first target speed V_ref1, shifting the sensorless permanent magnet synchronous motor from the open-loop control mode to a closed-loop control mode, and controlling the sensorless permanent magnet synchronous motor to run in the closed-loop control mode under the first target speed V_ref1, wherein shifting the sensorless permanent magnet synchronous motor from the open-loop control mode to the closed-loop control mode consists of reducing a sole parameter from Iq_max to a target current Iq0 corresponding to a target torque T0 set by users, and the sole parameter is an upper limit of current on the q-axis.

2. The method of claim 1, wherein the method further comprises: in the closed-loop control mode under the first target speed V_ref1, increasing the first target speed V_ref1 to a maximum target speed V_max; when the actual running speed V of the sensorless permanent magnet synchronous motor reaches the maximum target speed V_max, controlling the sensorless permanent magnet synchronous motor to run in a closed-loop control mode under the maximum target speed V_max; and when the actual running speed V of the sensorless permanent magnet synchronous motor is less than the maximum target speed V_max, controlling the sensorless permanent magnet synchronous motor to run in a constant torque closed-loop control mode.

3. The method of claim 2, wherein in the constant torque closed-loop control mode, the sensorless permanent magnet synchronous motor runs under the target torque T0; the target torque T0 is output by controlling the target current Iq0 on the q-axis by a proportional integral (PI) controller.

4. The method of claim 3, wherein in the constant torque closed-loop control mode, when a command torque is smaller than expected or a load is increased, the actual running speed V is smaller than a preset minimum target speed V_min, and the sensorless permanent magnet synchronous motor exits the constant torque closed-loop control mode and enters a constant speed control mode, and then increasing the target torque T0 by an extra current delta_Iq0, so that the sensorless permanent magnet synchronous motor runs in the constant speed closed-loop control mode under the minimum target speed V_min.

5. The method of claim 4, wherein when the sensorless permanent magnet synchronous motor runs in the constant speed closed-loop control mode under the minimum target speed V_min, and a speed difference Err between the actual running speed V and the minimum target speed V_min is greater than a preset value E0, the sensorless permanent magnet synchronous motor exits the constant speed control mode and enters a constant torque closed-loop control mode under the target torque T0.

6. The method of claim 1, wherein the actual running speed V refers to a real-time detected speed Vt obtained after the sensorless permanent magnet synchronous motor runs for a time T2 under the first target speed V_ref1, and the real-time detected speed Vt is equivalent to the first target speed V_ref1.

7. The method of claim 2, wherein the actual running speed V refers to a real-time detected speed Vt obtained after the sensorless permanent magnet synchronous motor runs for a time T2 under the first target speed V_ref1, and the real-time detected speed Vt is equivalent to the first target speed V_ref1.

8. The method of claim 3, wherein the actual running speed V refers to a real-time detected speed Vt obtained after the sensorless permanent magnet synchronous motor runs for a time T2 under the first target speed V_ref1, and the real-time detected speed Vt is equivalent to the first target speed V_ref1.

9. The method of claim 4, wherein the actual running speed V refers to a real-time detected speed Vt obtained after the sensorless permanent magnet synchronous motor runs for a time T2 under the first target speed V_ref1, and the real-time detected speed Vt is equivalent to the first target speed V_ref1.

10. The method of claim 5, wherein the actual running speed V refers to a real-time detected speed Vt obtained after the sensorless permanent magnet synchronous motor runs for a time T2 under the first target speed V_ref1, and the real-time detected speed Vt is equivalent to the first target speed V_ref1.

11. The method of claim 6, wherein the time T2 ranges from 2-4 seconds, and a difference between the real-time detected speed Vt and the first target speed V_ref1 is within 10 rpm.

12. The method of claim 7, wherein the time T2 ranges from 2-4 seconds, and a difference between the real-time detected speed Vt and the first target speed V_ref1 is within 10 rpm.

13. The method of claim 8, wherein the time T2 ranges from 2-4 seconds, and a difference between the real-time detected speed Vt and the first target speed V_ref1 is within 10 rpm.

14. The method of claim 9, wherein the time T2 ranges from 2-4 seconds, and a difference between the real-time detected speed Vt and the first target speed V_ref1 is within 10 rpm.

15. The method of claim 10, wherein the time T2 ranges from 2-4 seconds, and a difference between the real-time detected speed Vt and the first target speed V_ref1 is within 10 rpm.

\* \* \* \* \*